(12) United States Patent
Wu (10) Patent No.: US 7,509,974 B2
(45) Date of Patent: Mar. 31, 2009

(54) METALLIC BALL FOR A BALLCOCK

(75) Inventor: Ting-Kuo Wu, Tucheng (TW)

(73) Assignee: Finetek Co., Ltd., Taipei Hsien (TW)

( * ) Notice: Subject to any disclaimer, the term of this patent is extended or adjusted under 35 U.S.C. 154(b) by 268 days.

(21) Appl. No.: 11/651,783

(22) Filed: Jan. 10, 2007

(65) Prior Publication Data

US 2008/0164438 A1    Jul. 10, 2008

(51) Int. Cl.
*F16K 21/18* (2006.01)
*G05D 9/12* (2006.01)

(52) U.S. Cl. .................. 137/392; 137/391; 73/322.5

(58) Field of Classification Search .............. 137/391, 137/392, 558; 73/322.5, 305, 313, 314
See application file for complete search history.

(56) References Cited

U.S. PATENT DOCUMENTS 3,646,293 A * 2/1972 Howard .................. 200/84 C
4,142,079 A * 2/1979 Bachman ................ 200/84 C
4,248,088 A * 2/1981 McGown et al. .............. 73/319
4,841,107 A * 6/1989 Tandler et al. ............ 200/84 C
4,924,703 A * 5/1990 White et al. .................. 73/308
5,020,367 A * 6/1991 White ........................ 73/319
5,103,673 A * 4/1992 Sawada et al. ............... 73/313
6,230,561 B1 * 5/2001 Li ............................. 73/322.5

* cited by examiner

*Primary Examiner*—John K Fristoe, Jr.
(74) *Attorney, Agent, or Firm*—William E. Pelton, Esq.; Cooper & Dunham LLP (57) ABSTRACT

A metallic ball has a sliding sleeve, a shell, at least one magnet and a mounting bracket. The sliding sleeve has an open upper end, an open lower end and an outer surface. The shell is spherical, is mounted securely around the sliding sleeve between the open upper end and the open lower end of the sliding sleeve and has a reinforcing disk mounted around the outer surface of the sliding sleeve and has a top surface and may have a protruding portion. The magnet is on the top surface of the reinforcing disk. The mounting bracket is mounted around the sliding sleeve and on the top surface of the reinforcing disk to cover the magnet and has a wall extending toward and engaging the reinforcing disk and completely covering the magnet to effectively avoid the magnet being broken or damaged.

12 Claims, 10 Drawing Sheets

METALLIC BALL FOR A BALLCOCK

BACKGROUND OF THE INVENTION

1. Field of the Invention

The present invention relates to a ballcock, and more particularly to a metallic ball for a ballcock that is easily fabricated and has a stable and enhanced structure and keeps components inside the metallic ball from being broken or damaged.

2. Description of Related Art

Ball assemblies are mounted inside tanks, especially in tanks or containers filled with high pressure, corrosive or toxic liquid, to prevent overflow.

Figure 8:
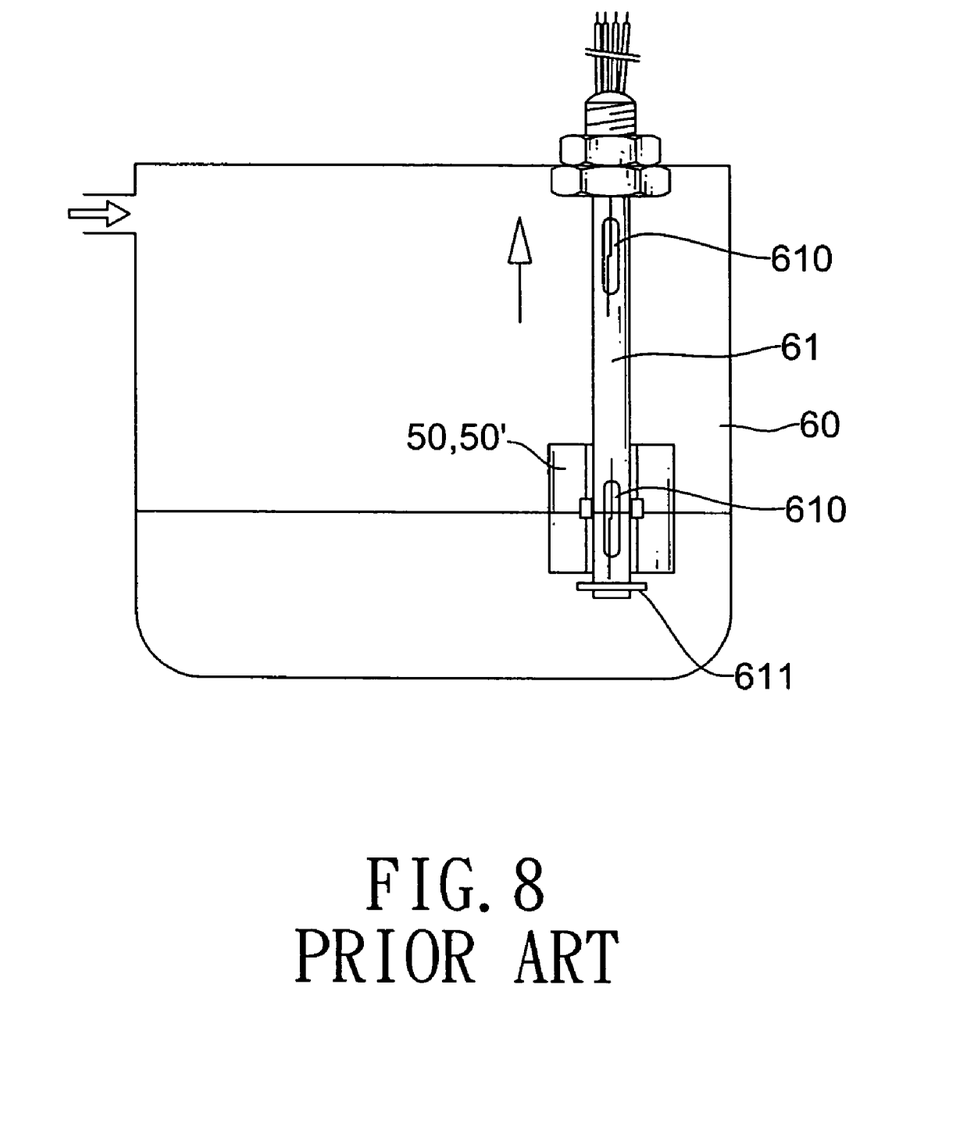
FIG. 8 is an operational side view of a conventional ball in a ballcock.
Figure 9:
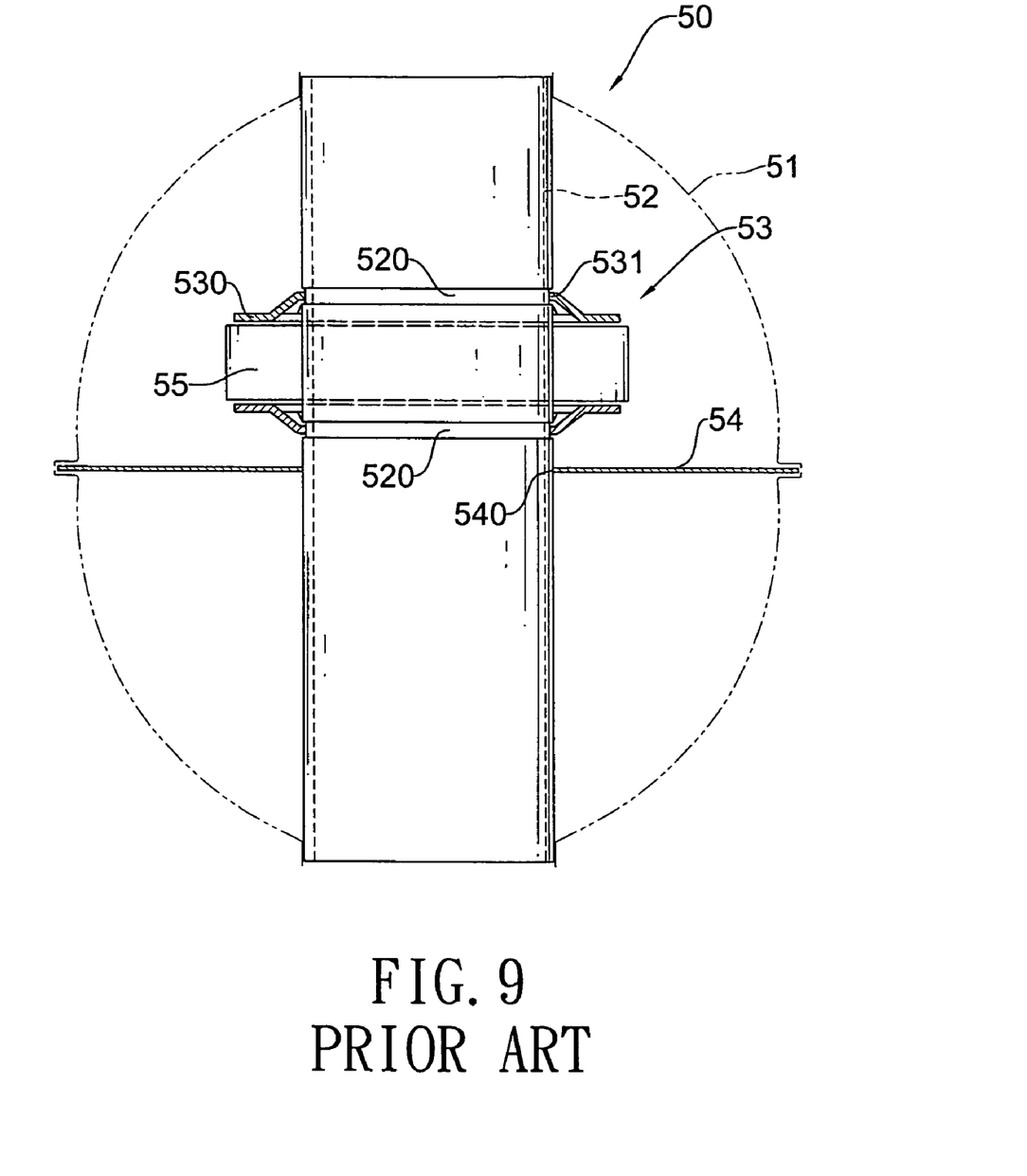
FIG. 9 is a cross sectional side view of a conventional metallic ball in accordance with prior art for a ballcock.
Figure 10:
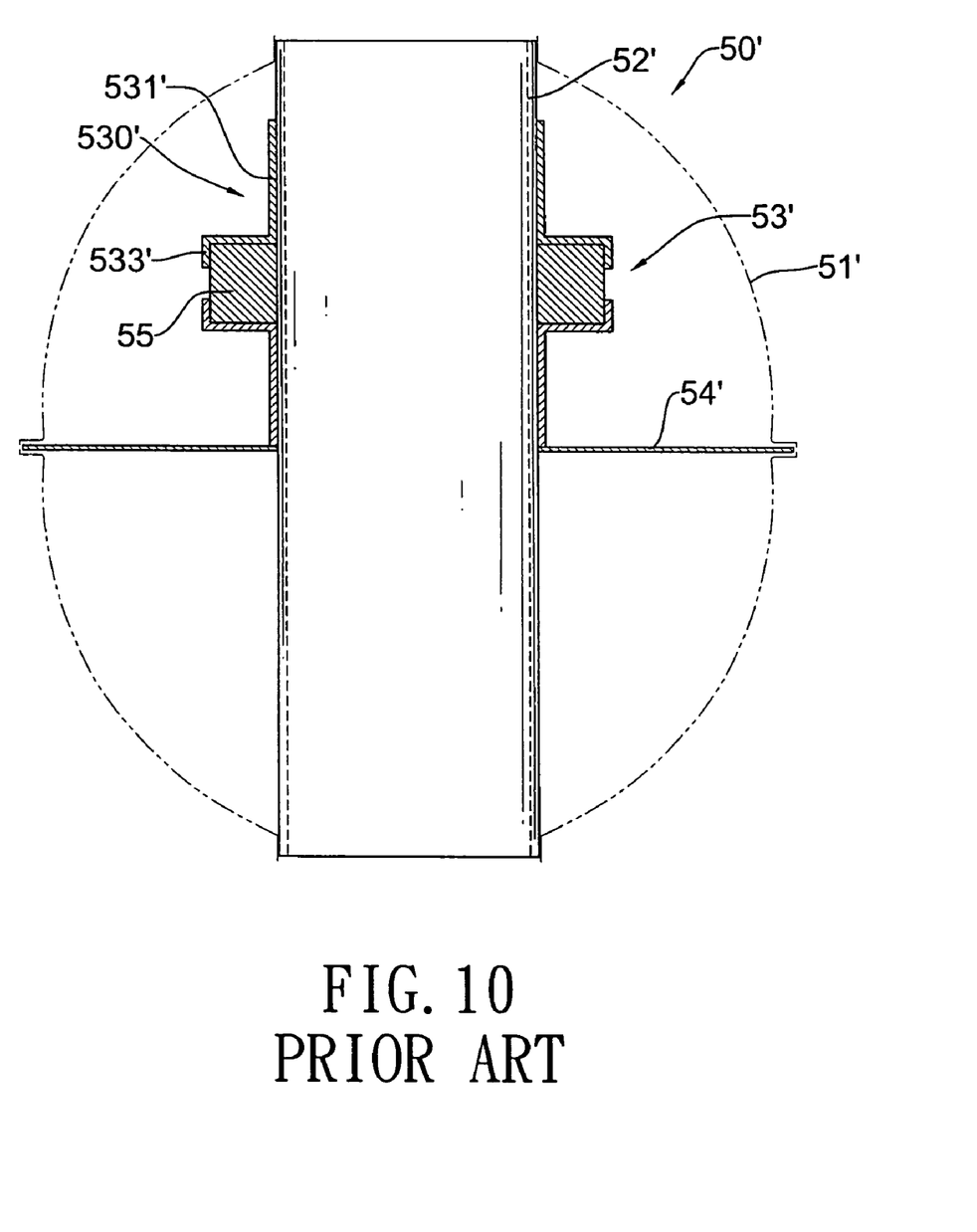
FIG. 10 is a cross sectional side view of another embodiment of a conventional metallic ball in accordance with prior art for a ballcock.

With reference to FIGS. 8, 9 and 10, conventional ball assemblies for a ballcock comprise a standpipe (61) and a metallic ball (50, 50').

The standpipe (61) is securely mounted vertically inside a tank (60) and has a top end, a bottom end and two magnetic switches (610). The magnetic switches (610) are mounted respectively in the top end and the bottom end of the standpipe (61) and are connected to a valve controller that opens or closes a valve to fill the tank (60) or shut off liquid to the tank (60).

The metallic ball (50, 50') is mounted slidably on the standpipe (61), floats on liquid in the tank (60) and changes position on the standpipe (61) based on liquid level in the tank. The metallic ball (50, 50') comprises a sliding sleeve (52, 52'), a shell (51, 51'), at least one mounting bracket (53, 53') and at least one magnet (55).

The sliding sleeve (52, 52') is cylindrical and has an open upper end, an open lower end, an outer surface and at least one optional pair of annular grooves (520). The at least one pair of annular grooves (520) is formed in the outer surface of the sliding sleeve (52) between the open ends, and the annular grooves (520) are parallel to each other.

The shell (51, 51') is spherical, is mounted securely around the sliding sleeve (52, 52') between the open ends of the sliding sleeve (52, 52'), has an inner surface and may have a reinforcing disk (54, 54'). The reinforcing disk (54, 54') is mounted securely around the sliding sleeve (52, 52') and abuts the inner surface of the shell (51, 51').

The mounting bracket (53, 53') is mounted around and attached to the outer surface of the sliding sleeve (52, 52') and has two annular flanges (530, 530'). The annular flanges (530, 530') are mounted around and protrude from the sliding sleeve (52, 52'), and each annular flange (530, 530') has an inner edge, an outer edge, at least one connector (531, 531') and an optional lip (533').

In a first embodiment of the metallic ball (50), multiple connectors (531) are formed on and protrude in from the inner edge and are mounted in the corresponding annular groove (520) of a pair of annular grooves (520) in the sliding sleeve (52).

In a second embodiment of the metallic ball (50'), the connector (531') is tubular, is connected to the inner edge of the annular flange (530') and is welded, riveted or otherwise attached to the sliding sleeve (52'), and the lip (533') is formed on and protrudes perpendicularly from the outer edge of the annular flange (530').

A magnet (55) is mounted around the sliding sleeve (52), is clamped between the annular flanges (530) (530') of each mounting bracket (53)(53'), is held by the lip (533') and toggles the corresponding magnetic switch (610) in the top end or the bottom end of the standpipe (61) when the magnet (55) aligns with the switch (610).

However, conventional metallic balls (50, 50') have a number of shortcomings. First, which causes the magnets (55) may be broken or damaged easily since the magnets (55) are not covered completely by the mounting brackets (53, 53'), which reduces the interaction between the magnets (55) and the magnetic switches (610). Furthermore, connecting the mounting brackets (53, 53') to the sliding sleeve (52, 52') makes fabrication of the conventional metallic balls (50, 50') difficult and quite likely decreases the strength of the sliding sleeves (52, 52') since the mounting brackets (53, 53') are clamped, welded or riveted on the sliding sleeves (52, 52').

To overcome the shortcomings, the present invention provides a metallic ball for a ballcock to obviate or mitigate the aforementioned problems.

SUMMARY OF THE INVENTION

The main objective of the present invention is to provide a metallic ball for a ballcock that is fabricated easily, has a stable and strong structure and keeps components inside the metallic ball from being broken or damaged.

To achieve the objective, the metallic ball in accordance with present invention for a ballcock comprises a sliding sleeve, a shell, at least one magnet and a mounting bracket. The sliding sleeve is cylindrical and hollow and has an open upper end and an open lower end. The shell is spherical, is mounted securely around the sliding sleeve between the open upper end and the lower end of the sliding sleeve and has a reinforcing disk that is mounted around the sliding sleeve and has a top surface and may have a protruding portion. The magnet is on the top surface of the reinforcing disk. The mounting bracket is mounted around the sliding sleeve and on the top surface of the reinforcing disk to cover the magnet and has a rim and a wall. The wall is formed along the rim of the mounting bracket, is extending toward and engaging the reinforcing disk that completely covers the magnet.

With such an arrangement, the magnet of the metallic ball in accordance with present invention is well protected by the mounting bracket and effectively avoiding being broken or damaged. Moreover, the metallic ball is easily to be fabricated. Plus, the mounting bracket is stable and won't decrease the strength of the sliding sleeve.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1, 2, 5, 6, 7 and 8, the metallic ball in accordance with present invention for a ballcock is mounted slidably on a standpipe (61) inside a tank (60) and comprises a sliding sleeve (20), a shell (10), at least one magnet (30, 30') and a mounting bracket (40, 40').

Figure 1:
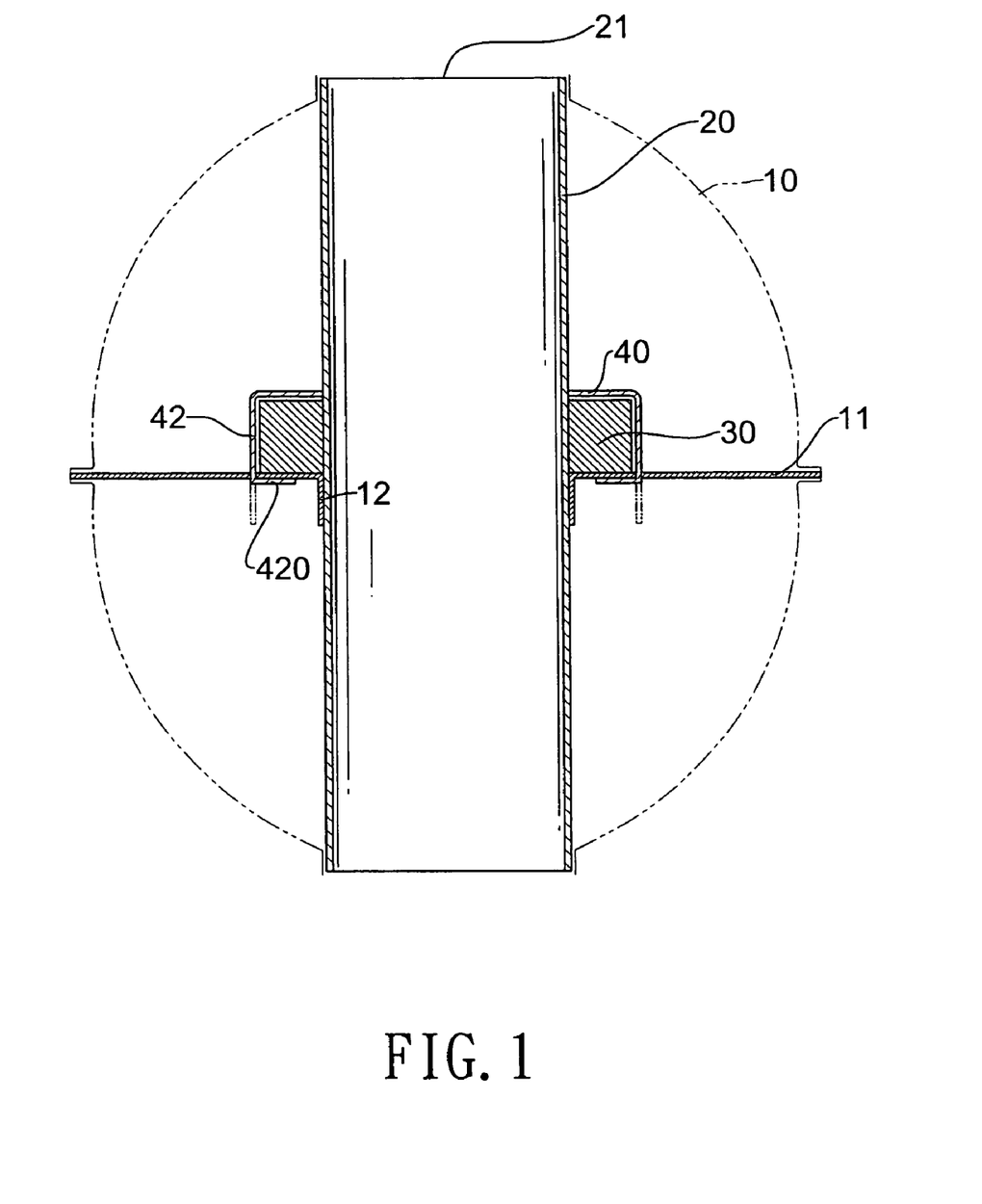
FIG. 1 is a cross sectional side view of a first embodiment a metallic ball in accordance with the present invention for a ballcock.

The sliding sleeve (20) is cylindrical and metallic and has an open upper end (21), an open lower end and an outer surface.

Figure 3:
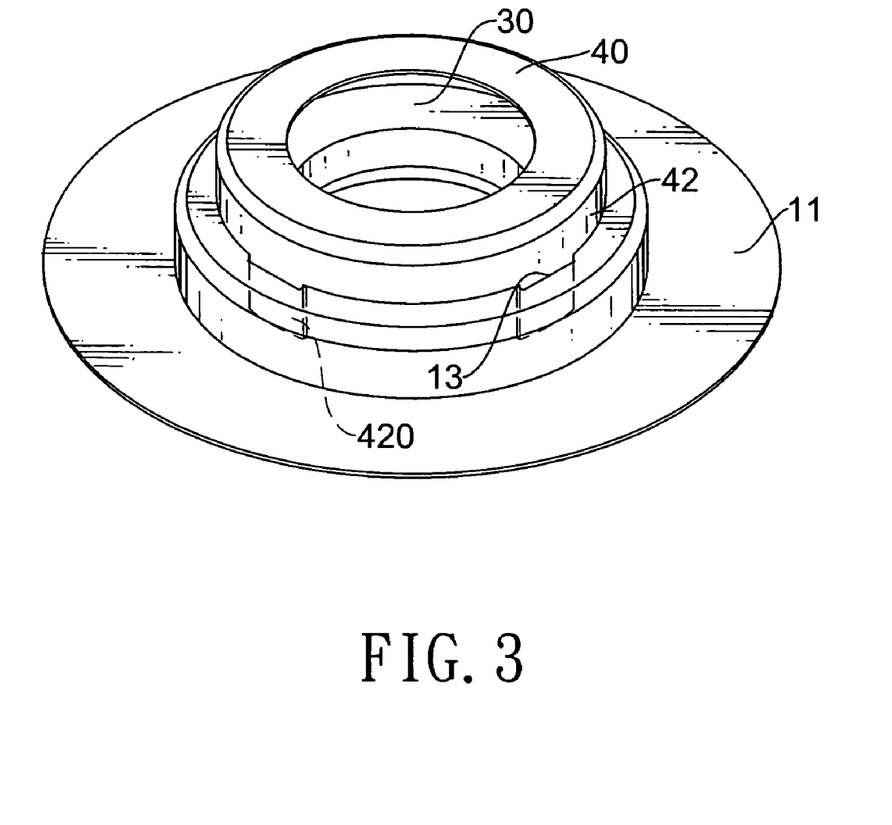
FIG. 3 is a perspective view of the inner elements in FIG. 2.
Figure 4:
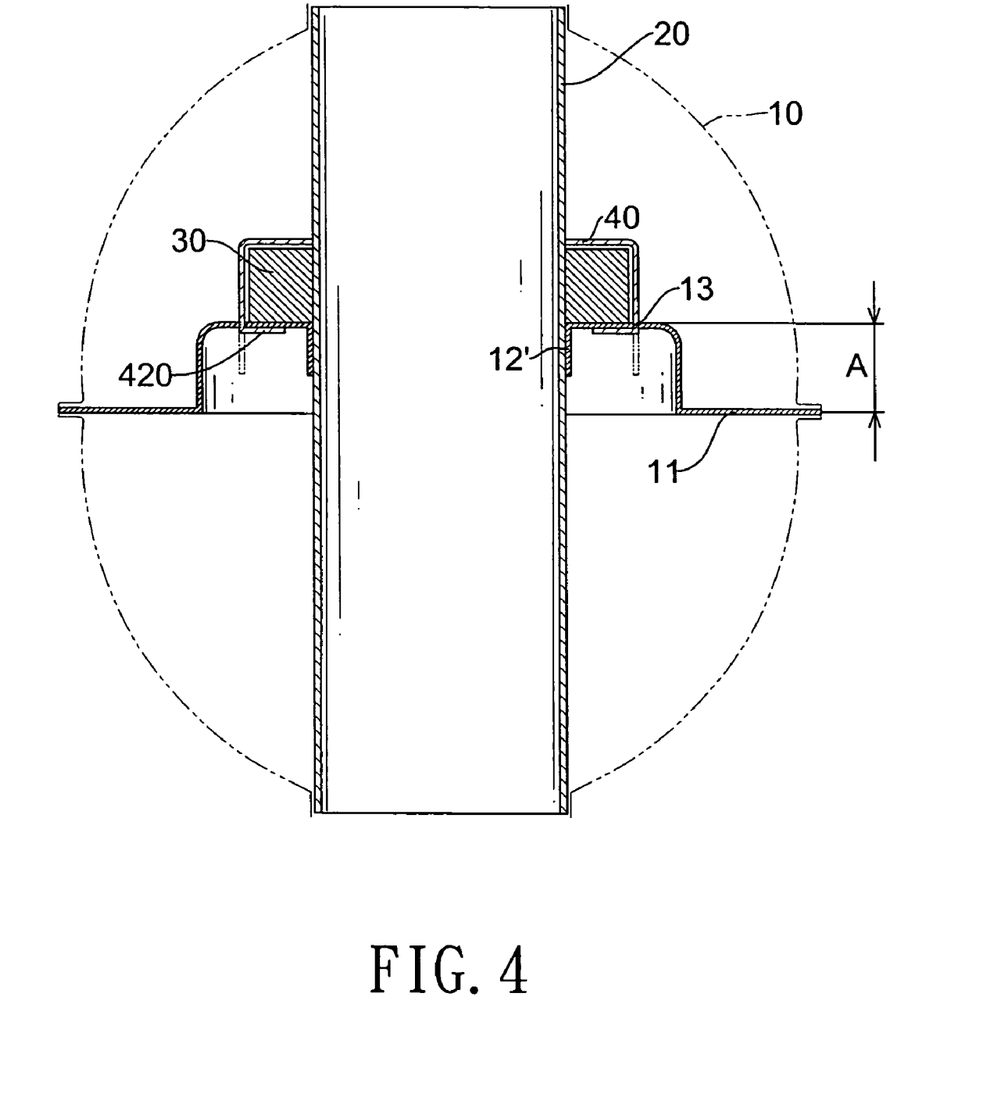
FIG. 4 is a cross sectional side view of the second embodiment of the metallic ball for a ballcock.

With further reference to FIGS. 3 and 4, the shell (10) is metallic and spherical, is mounted securely around the sliding sleeve (20) between the upper end (21) and the lower end of the sliding sleeve (20) and has a reinforcing disk (11). The reinforcing disk (11) is mounted around the sliding sleeve (20) between the upper end (21) and the lower end and has a top surface, a center hole (12) and an optional protruding portion. The center hole (12) is formed corresponding to the sliding sleeve (20) for the sliding sleeve (20) to extend through and has an edge abutting the surface of the sliding sleeve (20). The protruding portion has a height A from the top surface of the reinforcing disk (11) and has multiple slots (13) formed around the center hole (12) at an interval.

Figure 2:
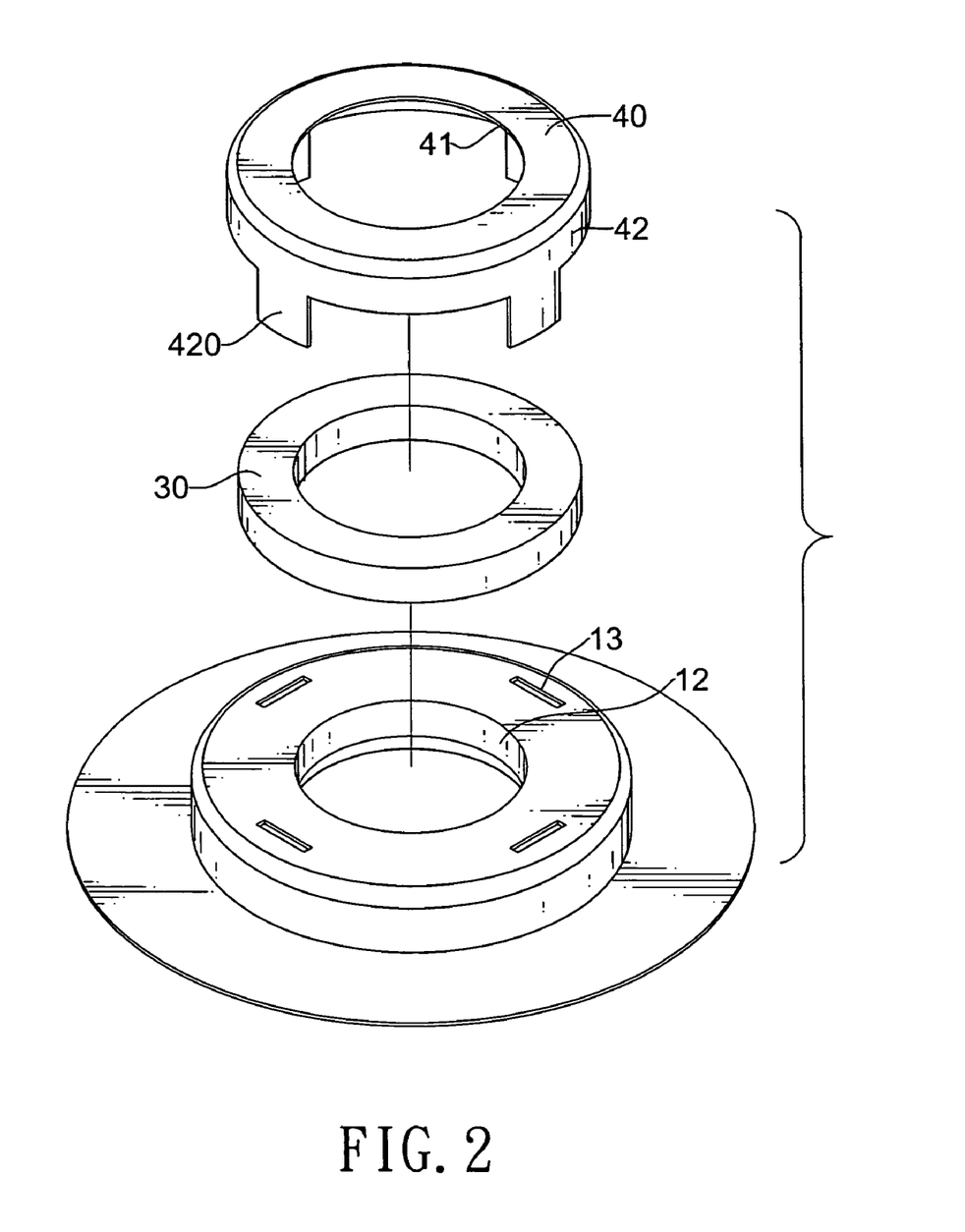
FIG. 2 is an exploded perspective view of inner elements of a second embodiment of a metallic ball in accordance with the present invention for a ballcock.
Figure 5:
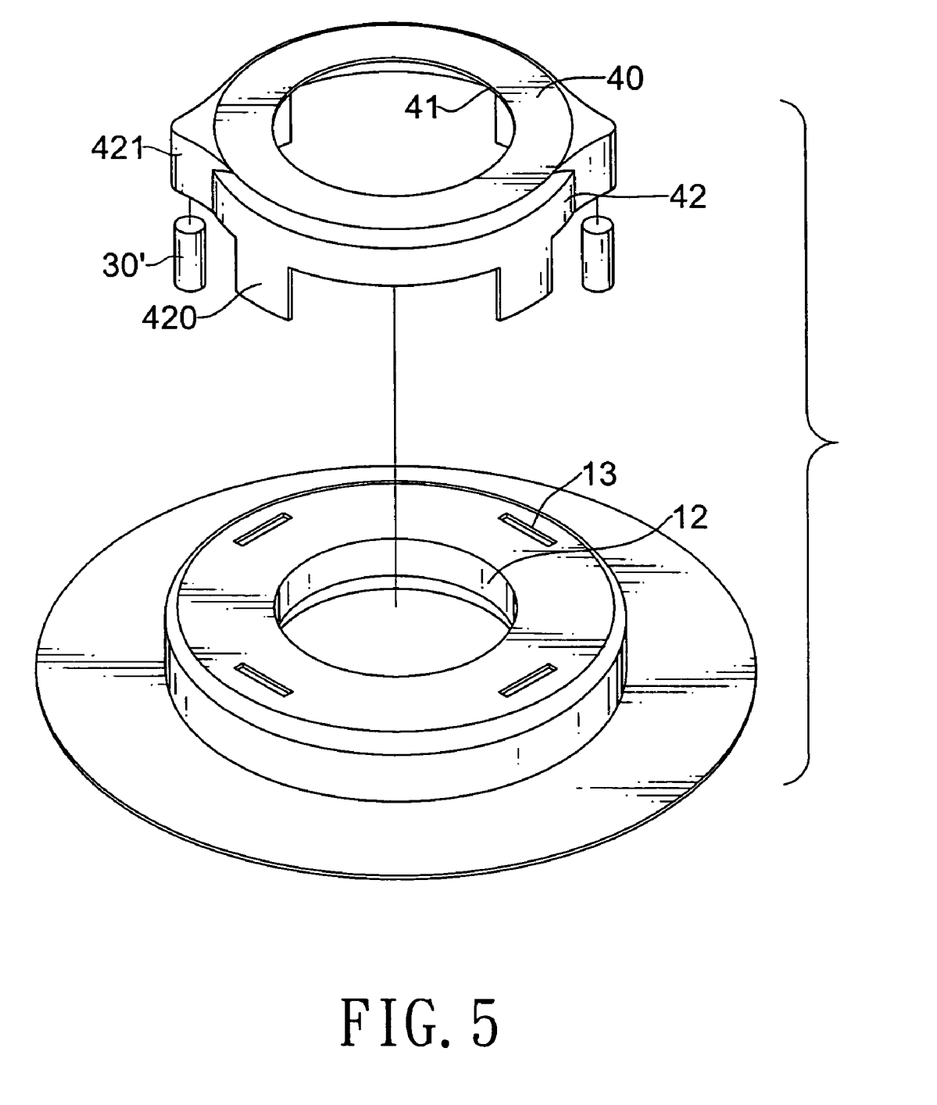
FIG. 5 is an exploded perspective view of inner elements of a third embodiment of a metallic ball in accordance with the present invention for a ballcock.

With reference to FIGS. 2 and 5, the magnet (30) is circular and is mounted on the top surface of the reinforcing disk (11) around the sliding sleeve (20), or the magnets (30') are respectively cylindrical and are on the top surface of the reinforcing disk (11) opposite to each other.

With reference to FIGS. 1, 2, 5 and 7, the mounting bracket (40) is made of magnesium alloy, titanium alloy or plastic, is mounted around the surface of the sliding sleeve (20), covers the magnet (30) and has a rim and a wall (42). The wall (42) is formed perpendicularly along the rim of the mounting bracket (40), is extending toward and abuts the top surface of the reinforcing disk (11) that completely covers the magnets and has an outer surface, an inner surface, a bottom edge, two optional magnet retainers (421), an optional annular detent (43) and multiple mounting tabs (420). The bottom edge abuts the top surface of the reinforcing disk (11). The magnet retainers (421) are formed oppositely on the outer surface of the wall (42) and each magnet retainer (421) defines a space to receive one of the magnets (30') and can be pressed to deform and clamp the magnet (30'). The annular detent (43) is formed around and protrudes in from the inner surface of the wall (42), supports the magnet (30) and is a specific height (B) from the bottom edge of the wall (42). The mounting tabs (420) are protruding from the bottom edge of the wall (42) at an interval, are respectively correspond to and inserted in the slots (13) of the protruding portion of the reinforcing disk (11) and may be bent to connect with the reinforcing disk (11) to keep the magnet (30,30') in position.

Figure 6:
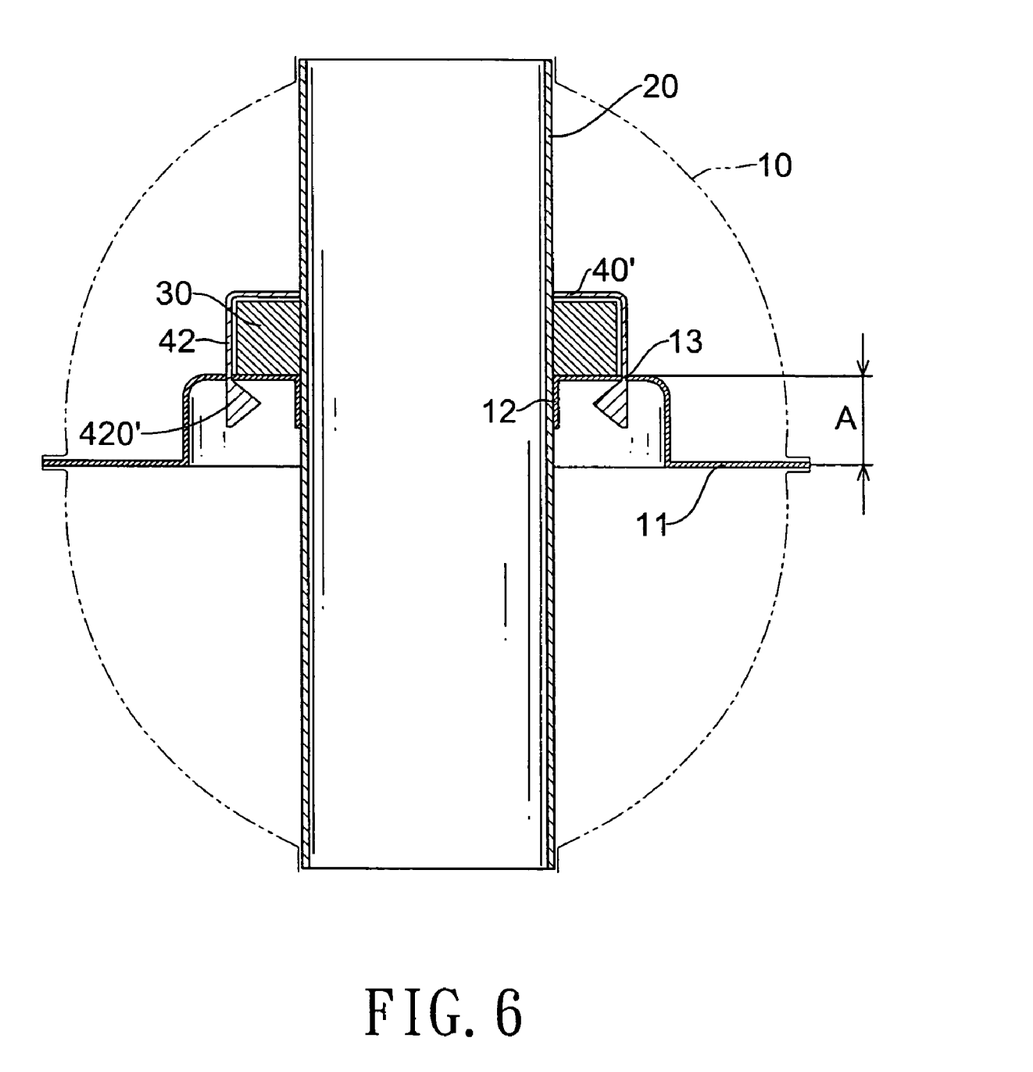
FIG. 6 is a cross sectional side view of a fourth embodiment a metallic ball in accordance with the present invention for a ballcock.
Figure 7:
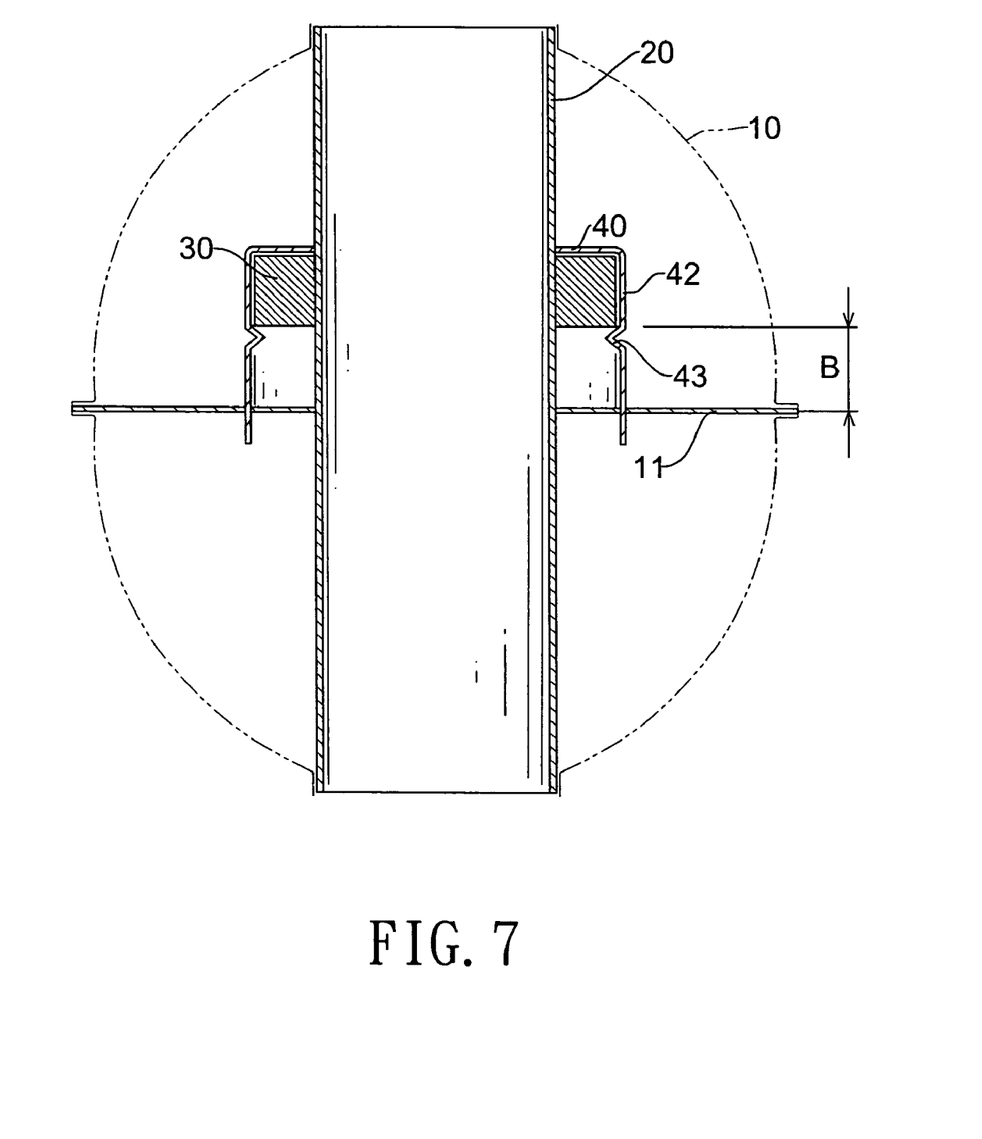
FIG. 7 is a cross sectional side view of a fifth embodiment of a metallic ball in accordance with the present invention for a ballcock.

With reference to FIG. 6, the mounting bracket (40') is plastic, is mounted around the surface of the sliding sleeve (20) and covering the magnet (30) and has a rim and a wall (42). The wall (42) is formed perpendicularly along the rim of the mounting bracket (40'), is extending toward and abuts the top surface of the reinforcing disk (11') that completely covers the magnets (30) and has a bottom edge and multiple hooks (420'). The bottom edge abuts the top surface of the reinforcing disk (11'). The hooks (420') are protruding from the bottom edge of the wall (42) at an interval, each hook (420') has a distal end and a tooth formed in the distal end. The hooks (420') respectively correspond to and insert into the slots (13) of the protruding portion of the reinforcing disk (40') and engage with the reinforcing disk (40') by the teeth to keep the magnet (30) in position.

With such an arrangement, the magnet (30,30') of the metallic ball in accordance with present invention is well protected by the mounting bracket (40,40') and effectively avoiding being broken or damaged.

Moreover, the mounting bracket (40,40') is easily to be assembled with the reinforcing disk (11) and therefor facilitates the fabrication of the metallic ball. Plus, the mounting bracket (40,40') is stable and won't decrease the strength of the sliding sleeve (20).

Besides, the position of the magnets (30,30') in the ballcock can be adjusted by determination of the height A of the protruding portion of the reinforcing disk (11) or the height B of the annular detent (43) of the mounting bracket (40). With such adjustment, the interaction between the magnets (30,30') and the magnetic switches (610) may be more effective.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A metallic ball comprising
   a sliding sleeve having
      an open upper end;
      an open lower end; and
      an outer surface;
   a shell being mounted securely around the sliding sleeve
      between the open ends of the sliding sleeve and having a
      reinforcing disk being mounted around the sliding
      sleeve and having
      a top surface; and
      a center hole being formed corresponding to the sliding
         sleeve for the sliding sleeve to extend through and
         having an edge abutting the surface of the sliding
         sleeve;
   at least one magnet being mounted on the top surface of the
      reinforcing disk; and
   a mounting bracket being mounted around the surface of
      the sliding sleeve and covering the at least one magnet
      and having
      a rim; and
      a wall being formed perpendicularly along the rim of the
         mounting bracket, being extending toward and abutting the top surface of the reinforcing disk that completely covering the at least one magnet and having a
         bottom edge being abutting and attached to the top
         surface of the reinforcing disk.

2. The metallic ball as claimed in claim 1, wherein the reinforcing disk further has a protruding portion having multiple slots formed around the center hole of the reinforcing disk at an interval.

3. The metallic ball as claimed in claim 2, wherein the mounting bracket further has multiple mounting tabs being protruding from the bottom edge of the wall at an interval, respectively corresponding to and inserted into the slots of the protruding portion of the reinforcing disk and being bent to connect with the reinforcing disk.

4. The metallic ball as claimed in claim 2, wherein the mounting bracket is plastic; and the wall of the mounting bracket further has multiple hooks respectively corresponding to and inserting in the slots of the reinforcing disk, each hook having
 a distal end; and
 a tooth formed in the distal end and engaging with the reinforcing disk.

5. The metallic ball as claimed in claim 1, wherein the metallic ball has only one magnet, and the magnet being circular and being mounted around the surface of the sliding sleeve.

6. The metallic ball as claimed in claim 1, wherein the metallic ball has two magnets; and
 the magnets are cylindrical and are opposite to each other;
 the wall of the mounting bracket further has an outer surface; and
 the mounting bracket further has two magnet retainers being formed oppositely on the outer surface of the wall and each magnet retainer defines a space to receive a corresponding magnet and being pressed to deform and clamp the corresponding magnet.

7. The metallic ball as claimed in claim 1, wherein the reinforcing disk further has a protruding portion having a height from the top surface of reinforcing disk.

8. The metallic ball as claimed in claim 1, wherein the wall of the mounting bracket further has
 an inner surface; and
 an annular detent being formed around and protruding from the inner surface of the wall, supporting the at least one magnet and having a height from the bottom edge of the wall.

9. The metallic ball as claimed in claim 1, wherein the sliding sleeve is metallic.

10. The metallic ball as claimed in claim 1, wherein the shell is metallic and is spherical.

11. The metallic ball as claimed in claim 1, wherein the mounting bracket is made of magnesium alloy.

12. The metallic ball as claimed in claim 1, wherein the mounting bracket is made of titanium alloy.

* * * * *